(12) United States Patent
Alletto et al.

(10) Patent No.: US 11,127,117 B2
(45) Date of Patent: Sep. 21, 2021

(54) INFORMATION PROCESSING METHOD, INFORMATION PROCESSING APPARATUS, AND RECORDING MEDIUM

(71) Applicant: Panasonic Intellectual Property Corporation of America, Torrance, CA (US)

(72) Inventors: Stefano Alletto, Sunnyvale, CA (US); Luca Rigazio, Campbell, CA (US); Sotaro Tsukizawa, Osaka (JP); Yasunori Ishii, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 140 days.

(21) Appl. No.: 16/558,908

(22) Filed: Sep. 3, 2019

(65) Prior Publication Data

US 2020/0082508 A1 Mar. 12, 2020

Related U.S. Application Data

(60) Provisional application No. 62/728,379, filed on Sep. 7, 2018.

(30) Foreign Application Priority Data

Mar. 6, 2019 (JP) .............................. JP2019-041037

(51) Int. Cl.
*G06T 5/00* (2006.01)
*G06N 20/00* (2019.01)
(Continued)

(52) U.S. Cl.
CPC .............. *G06T 5/002* (2013.01); *G06N 3/08* (2013.01); *G06N 20/00* (2019.01); *G06T 5/50* (2013.01);
(Continued)

(58) Field of Classification Search
CPC ................................. G06T 5/002; G06T 5/50
See application file for complete search history.

(56) References Cited

U.S. PATENT DOCUMENTS

2018/0075581 A1 3/2018 Shi et al.
2018/0293713 A1 10/2018 Vogels et al.

FOREIGN PATENT DOCUMENTS

GB 2555431 5/2018

OTHER PUBLICATIONS

Extended European Search Report dated Feb. 7, 2020 in corresponding European Patent Application No. 19194084.0.
(Continued)

*Primary Examiner* — Tuan H Nguyen
(74) *Attorney, Agent, or Firm* — Wenderoth, Lind & Ponack, L.L.P.

(57) ABSTRACT

An information processing method performed using a computer includes: obtaining first sensor data (SD) that is SD of a scene and includes noise; inputting the first SD to a single converter, and obtaining second SD outputted from the single converter as a result of denoising performed on the first SD by the single converter; obtaining third SD that is SD of a scene identical or corresponding to the scene, does not include the noise, and is different from the second SD; obtaining feature information of the second SD and feature information of the third SD, based on the second SD and the third SD, respectively; and training the single converter by machine learning using the second SD and the feature information of the second SD as converted data, and using the third SD and the feature information of the third SD as reference data corresponding to the converted data.

8 Claims, 5 Drawing Sheets

(51) Int. Cl.
    *G06N 3/08*    (2006.01)
    *G06T 5/50*    (2006.01)
(52) U.S. Cl.
    CPC .............. *G06T 2207/20081* (2013.01); *G06T 2207/20084* (2013.01)

(56) References Cited

OTHER PUBLICATIONS

Nithish Divakar et al., "Image Denoising via CNNs: An Adversarial Approach", Arxiv.org, Cornell University Library, 201 OLIN Library Cornell University, Ithaca, NY, Aug. 2017.

Li Chen et al., "Joint Denoising and Super-Resolution via Generative Adversarial Training", 2018 24th International Conference on Pattern Recognition (ICPR), IEEE, Aug. 2018.

Jelmer M. Wolterink et al., "Generative Adversarial Networks for Noise Reduction in Low-Dose CT", IEEE Transactions on Medical Imaging, vol. 36, No. 12, May 2017.

Qingsong Yang et al., "Low Dose CT Image Denoising Using a Generative Adversarial Network with Wasserstein Distance and Perceptual Loss", Arxiv.org, Cornell University Library, 201 OLIN Library Cornell University, Ithaca, NY, Aug. 2017.

Orest Kupyn et al., "DeblurGAN: Blind Motion Deblurring Using Conditional Adversarial Networks", 2018 IEEE/CVF Conference on Computer Vision and Pattern Recognition, IEEE, Jun. 2018.

Christian Ledig et al., "Photo-Realistic Single Image Super-Resolution Using a Generative Adversarial Network", Sep. 2016.

Ian J. Goodfellow, et al., "Generative Adversarial Nets", Proceedings of Neural Information Processing Systems, Dec. 2014.

Phillip Isola, et al., "Image-to-Image Translation with Conditional Adversarial Networks", Proceedings of the IEEE Conference on Computer Vision and Pattern Recognition (CVPR), Jul. 2017, pp. 1125-1134.

Justin Johnson, et al., "Perceptual Losses for Real-Time Style Transfer and Super-Resolution", Proceedings of European Conference on Computer Vision, Mar. 2016.

Kaiming He, et al., "Deep Residual Learning for Image Recognition", Proceedings of the IEEE Conference on Computer Vision and Pattern Recognition (CVPR), Jun. 2016, pp. 770-778.

Andreas Geiger, et al., "Are we ready for Autonomous Driving? The KITTI Vision Benchmark Suite", Proceedings of the IEEE Conference on Computer Vision and Pattern Recognition (CVPR), Jun. 2012.

Office Action dated Feb. 11, 2021 in corresponding European Application No. 19194084.0.

Justin Johnson, et al., "Perceptual Losses for Real-Time Style Transfer and Super-Resolution", Mar. 2016, pp. 1-18, XP055431982.

INFORMATION PROCESSING METHOD, INFORMATION PROCESSING APPARATUS, AND RECORDING MEDIUM

CROSS REFERENCE TO RELATED APPLICATIONS

This application claims the benefit of priority of U.S. Provisional Patent Application No. 62/728,379 filed on Sep. 7, 2018 and Japanese Patent Application Number 2019-041037 filed on Mar. 6, 2019, the entire content of which is hereby incorporated by reference.

BACKGROUND

1. Technical Field

The present disclosure relates to an information processing method, an information processing apparatus, and a recording medium.

2. Description of the Related Art

A technique of denoising images rendered by Monte Carlo path tracing has been conventionally known as a technique that applies supervised machine learning to denoising of images of various scenes (see United States Patent Application Publication No. 2018/0293713).

SUMMARY

Since a denoiser used in the technique of denoising mentioned above includes a plurality of neural networks to handle various scenes, i.e., various types of noise, the denoiser requires a large amount of computation. Thus, the environment in which the denoiser is practically implementable is limited.

The present disclosure provides an information processing method, etc. that is capable of obtaining a single machine learning model that converts sensor data including a plurality of types of noise and outputs converted sensor data in which the plurality of types of noise as a whole are reduced.

An information processing method according to one aspect of the present disclosure includes the following performed using a computer: obtaining first sensor data that is sensor data of a scene and includes noise; inputting the first sensor data to a single converter, and obtaining second sensor data outputted from the single converter as a result of denoising performed on the first sensor data by the single converter; obtaining third sensor data that is sensor data of a scene identical or corresponding to the scene in the first sensor data, does not include the noise, and is different from the second sensor data; obtaining feature information of the second sensor data and feature information of the third sensor data, based on the second sensor data and the third sensor data, respectively; and training the single converter by machine learning using the second sensor data and the feature information of the second sensor data as converted data, and using the third sensor data and the feature information of the third sensor data as reference data corresponding to the converted data.

Moreover, an information processing apparatus according to one aspect of the present disclosure includes: a processor; and a memory. The memory stores a single converter, the processor: obtains first sensor data that is sensor data of a scene, includes noise, and is generated by an imaging device; inputs the first sensor data to the single converter, and obtains second sensor data outputted from the single converter as a result of denoising performed on the first sensor data by the single converter; and outputs the second sensor data obtained, and the single converter is trained by machine learning using, as converted data, the second sensor data and feature information of the second sensor data based on the second sensor data, and using, as reference data corresponding to the converted data, third sensor data and feature information of the third sensor data based on the third sensor data, the third sensor data being sensor data of a scene identical or corresponding to the scene in the first sensor data, not including the noise, and being different from the second sensor data.

Moreover, a recording medium according to one aspect of the present disclosure is a non-transitory computer-readable recording medium readable from a computer including a processor and a memory, the recording medium having a computer program recorded thereon for causing the computer, when executed by the processor using the memory, to perform operations including: obtaining first sensor data that is sensor data of a scene, includes noise, and is generated by an imaging device; inputting the first sensor data to a single converter stored in the memory, and obtaining second sensor data outputted from the single converter as a result of denoising performed on the first sensor data by the single converter; and outputting the second sensor data obtained. The single converter is trained by machine learning using, as converted data, the second sensor data and feature information of the second sensor data based on the second sensor data, and using, as reference data corresponding to the converted data, third sensor data and feature information of the third sensor data based on the third sensor data, the third sensor data being sensor data of a scene identical or corresponding to the scene in the first sensor data, not including the noise, and being different from the second sensor data.

Note that these general or specific aspects may be implemented by a system, an integrated circuit, or a computer program, or any combination of an apparatus, a system, an integrated circuit, a method, a computer program, and a computer-readable recording medium.

With the information processing method, etc. according to one aspect of the present disclosure, a single machine learning model can be obtained that converts sensor data including a plurality of types of noise and outputs converted sensor data in which the plurality of types of noise as a whole are reduced.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

Figure 1:
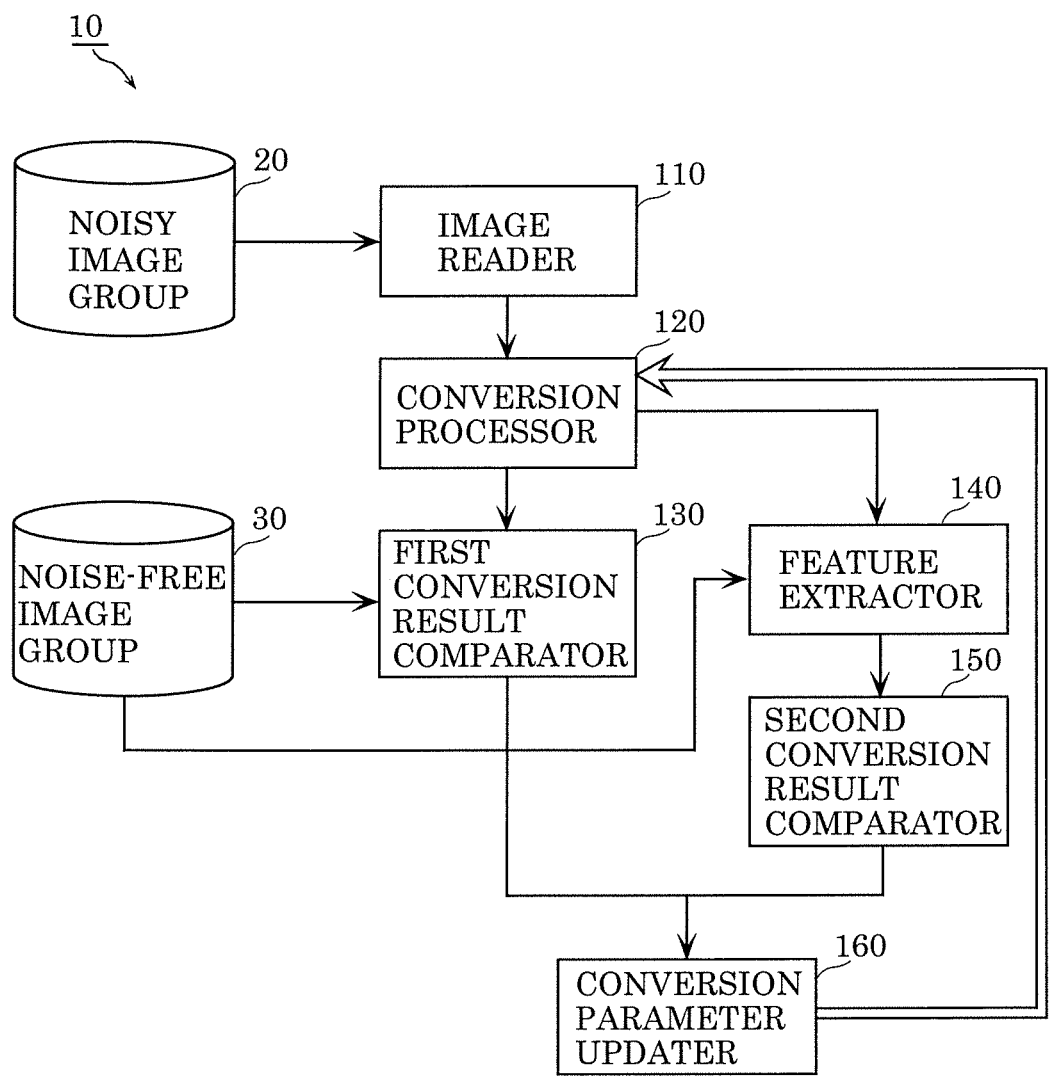
FIG. 1 is a block diagram illustrating an example of a functional configuration of an information processing apparatus according to an embodiment.

DETAILED DESCRIPTION OF THE EMBODIMENT (Underlying Knowledge Forming Basis of the Present Disclosure)

The inventors have found that the above-described conventional technique has the following problems.

An image including different types of noise can also be considered to be an image of different types of scenes in the conventional technique mentioned above. An example of the types of noise mentioned here is Gaussian noise that appears in an image captured in a dark place with a high sensitivity setting. Other examples include drop of pixels due to a failure in a sensor and blown-out highlights due to overexposure. Since characteristic tendencies that appear on an image differ from each other depending on the types of noise, necessary image processing for removing each noise differs. For example, performing a certain type of data smoothing on pixel values is effective to remove Gaussian noise. Some blown-out highlights can be reduced by lowering the brightness of a particularly bright portion in the image using a tone curve. Note that the above-mentioned noise is only a few examples of types of noise that may be included in an image. Other than the above, the term "noise" in the present disclosure also includes: black defects, vignetting, color shift due to chromatic aberration, fixed pattern noise, random noise, jaggies, dither, block noise, mosquito noise. These types of noise appear in an image because of various kinds of causes that arise in an image-capturing environment, optical system or circuit system of image-capturing equipment, or data processing such as compression, etc. Moreover, noise to be removed from an image in the present disclosure may also include distortion, and a ghost image of a foreign object in the optical system due to a substance attached to a lens, etc. In addition, artifacts which do not have specific names such as those mentioned above, and composite noise of these noise may be included in the noise to be removed from an image in the present disclosure. In order to remove these various types of noise using a neural network, the conventional technique uses a plurality of neural network models each of which is specialized for a specific type of noise by training.

However, denoising using a plurality of neural network models requires a large amount of computation as a whole. Thus, the environment in which the above processing is practically implementable is limited in view of processing speed or power consumption. For example, it is difficult to practically implement such a conventional denoiser in edge devices with a limited processing capacity of a processor or limited available power. The edge devices are, for example, a mobile information terminal such as a digital camera (in the present disclosure, this term also includes a digital camcorder, and also simply called a camera) or smartphone.

Using a single neural network for denoising makes it possible to reduce the amount of computation necessary for processing. However, when the conventional method of training in machine learning is used to obtain a single model corresponding to a plurality of types of noise each having different characteristics, it may result in a model that is specialized for a certain type of noise. In other words, the denoising performance of the single model trained with the conventional training method differs depending on the types of noise. Thus, it is difficult to obtain a model having a performance required for removing various types of noise. There is a possibility that it takes too much time to train until a usable model is obtained, or the training cannot be completed, i.e., a model having a performance required may not be obtained.

An information processing method according to one aspect of the present disclosure provided to achieve both of suppression of the calculation load and stabilization of denoising performance of such a model for denoising an image obtained by training by machine learning includes the following performed using a computer: obtaining first sensor data that is sensor data of a scene and includes noise; inputting the first sensor data to a single converter, and obtaining second sensor data outputted from the single converter as a result of denoising performed on the first sensor data by the single converter; obtaining third sensor data that is sensor data of a scene identical or corresponding to the scene in the first sensor data, does not include the noise, and is different from the second sensor data; obtaining feature information of the second sensor data and feature information of the third sensor data, based on the second sensor data and the third sensor data, respectively; and training the single converter by machine learning using the second sensor data and the feature information of the second sensor data as converted data, and using the third sensor data and the feature information of the third sensor data as reference data corresponding to the converted data.

With this method, the model is trained to convert an input image into an image that more appropriately includes features of an image that does not include the noise. As a result, a single model having a denoising performance that is stable irrespective of the types of noise included in the inputted image can be obtained.

Furthermore, the feature information of the second sensor data may be obtained by inputting the second sensor data to a model that is trained by machine learning to output feature information of sensor data when the sensor data is inputted to the model, and the feature information of the third sensor data may be obtained by inputting the third sensor data to the model.

Furthermore, the model may be a multilayer neural network model, and the feature information of the second sensor data and the feature information of the third sensor data may be outputted from an intermediate layer of the model.

Furthermore, the intermediate layer may include a plurality of layers, and the feature information of the second sensor data and the feature information of the third sensor data may be outputted from a same layer among the plurality of layers.

Furthermore, a parameter of the single converter may be updated through the training, based on a difference between the second sensor data and the third sensor data, and a difference between the feature information of the second sensor data and the feature information of the third sensor data that are outputted from the same layer among the plurality of layers.

Furthermore, the difference between the second sensor data and the third sensor data may be outputted from a discriminator by inputting the second sensor data and the third sensor data to the discriminator, the discriminator being trained by machine learning to discriminate whether sensor data inputted is data converted by the single converter or reference data.

Furthermore, the first sensor data, the second sensor data, and the third sensor data may be image data outputted from an image sensor.

Furthermore, an information processing apparatus according to one aspect of the present disclosure includes: a processor; and a memory. The memory stores a single converter, the processor: obtains first sensor data that is sensor data of a scene, includes noise, and is generated by an imaging device; inputs the first sensor data to the single converter, and obtains second sensor data outputted from the single converter as a result of denoising performed on the first sensor data by the single converter; and outputs the second sensor data obtained, and the single converter is trained by machine learning using, as converted data, the second sensor data and feature information of the second sensor data based on the second sensor data, and using, as reference data corresponding to the converted data, third sensor data and feature information of the third sensor data based on the third sensor data, the third sensor data being sensor data of a scene identical or corresponding to the scene in the first sensor data, not including the noise, and being different from the second sensor data.

With the information processing apparatus, noise included in an image is removed at a stable level irrespective of its type.

Furthermore, a recording medium according to one aspect of the present disclosure is a non-transitory computer-readable recording medium readable from a computer including a processor and a memory, the recording medium having a computer program recorded thereon for causing the computer, when executed by the processor using the memory, to perform operations including: obtaining first sensor data that is sensor data of a scene, includes noise, and is generated by an imaging device; inputting the first sensor data to a single converter stored in the memory, and obtaining second sensor data outputted from the single converter as a result of denoising performed on the first sensor data by the single converter; and outputting the second sensor data obtained. The single converter is trained by machine learning using, as converted data, the second sensor data and feature information of the second sensor data based on the second sensor data, and using, as reference data corresponding to the converted data, third sensor data and feature information of the third sensor data based on the third sensor data, the third sensor data being sensor data of a scene identical or corresponding to the scene in the first sensor data, not including the noise, and being different from the second sensor data.

With the information processing apparatus that performs the program, noise included in an image is removed at a stable level irrespective of its type.

Note that these general or specific aspects may be implemented by a system, an integrated circuit, or a computer program, or any combination of an apparatus, a system, an integrated circuit, a method, a computer program, and a computer-readable recording medium.

Hereinafter, an embodiment of an information processing method and an information processing apparatus according to one aspect of the present disclosure is described with reference to the drawings. The embodiment described below shows a specific example of the present disclosure. Therefore, numerical values, shapes, structural elements, arrangement and connection configuration of the structural elements, steps, an order of the steps, and so on shown in the following embodiment are mere examples, and are not intended to limit the present disclosure. Furthermore, among the elements in the following embodiments, elements not recited in any of the independent claims defining the broadest concepts of the present disclosure are described as elements that can be optionally added. Moreover, each diagram is a schematic diagram and is not necessarily illustrated precisely.

Embodiment

The present disclosure describes an embodiment of a technique concerning denoising by dividing the process into a training phase and an inference phase. The training phase in the present disclosure is a phase for training a machine learning model that performs denoising on an image that includes noise. Furthermore, the inference phase in the present disclosure is a phase in which an image that does not include noise is inferred from an image that includes noise using the machine learning model obtained by training.

[1. Training Phase]
[1-1. Configuration]

FIG. 1 is a block diagram illustrating an example of a functional configuration of an information processing apparatus according to an embodiment. Information processing apparatus 10 according to the present embodiment is an apparatus that trains the machine learning model that removes noise included in an image.

As illustrated in FIG. 1, information processing apparatus 10 includes image reader 110, conversion processor 120, first conversion result comparator 130, feature extractor 140, second conversion result comparator 150, and conversion parameter updater 160.

For example, information processing apparatus 10 may be implemented by one computer including a processor and a memory. In this case, the above structural components of information processing apparatus 10 may be functional structural components implemented by the processor executing one or more programs stored in the memory, for example. Among the above structural components, conversion processor 120, first conversion result comparator 130, feature extractor 140, and second conversion result comparator 150 are machine learning models. Among these structural components, conversion processor 120 is subjected to the above training for removing noise included in an image. The training for the each machine learning model will be described later.

Image reader 110 receives an image that includes noise (in the present disclosure, also called a noisy image). For example, many noisy images may be collected in a recording medium as images to be inputted to be denoised by information processing apparatus 10. This recording medium may be one of the structural components of information processing apparatus 10. As another example, the recording medium may be a removable recording medium connected to an input and output interface (not illustrated) included in information processing apparatus 10. Still another example is that the input and output interface may be used for communication, and the recording medium may be a recording medium used by one or more other computers that communicate with information processing apparatus 10 through wired or wireless communication. FIG. 1 illustrates the images collected accordingly as noisy image group 20).

Each of the images included in noisy image group 20 includes at least one type of noise among the various types of noise listed above as examples of noise. Hereinafter, an image that includes noise to be input to image reader 110 is also called a first image. For example, the first image is an image generated by an imaging device (image sensor) included in a camera, etc., and includes noise caused by some kind of factor in the imaging device or an image-capturing environment. Another example of the first image is an image that includes noise resulting from processing performed on the image using a program. Processing on an image here means performing, on an image, processing that changes pixel values or the number of pixels as a result of the processing, irrespective of the presence or absence of noise before the processing. For example, the processing includes: adjusting the color tone, brightness, or contrast; converting gray scale; adding, deleting, or modifying a subject; enlarging or reducing size, or changing the compression ratio; and changing the format of an image. Processing on an image may be performed to add or simulate any of the above-mentioned noise to an image. The first image is inputted to conversion processor 120 from image reader 110.

Conversion processor 120 is an example of a converter (generator or denoiser) stored in the memory included in information processing apparatus 10 according to the present embodiment. Conversion processor 120 performs the conversion processing to remove noise (in the present disclosure, also called denoising) in the first image received from image reader 110. Conversion processor 120 is a single machine learning model. For example, conversion processor 120 is a model of a convolutional neural network.

After conversion processor 120 has performed the denoising on the first image, conversion processor 120 outputs a converted image (hereinafter, also called a second image) as a result of the processing. However, the second image in the training phase may still include noise. For example, because of insufficient denoising performance of conversion processor 120, the noise included in the first image may remain in the second image, or noise that is not included in the first image may be added to the second image as a side effect of denoising. Noise is highly likely to be included in the second image especially during the early stages of training of conversion processor 120. Furthermore, the captured scene (subject and composition) is common to the first image and the second image, except for the portion degraded by noise.

Note that in training of conversion processor 120, the data of the second image outputted as a result of the conversion (also called converted data in the present disclosure) is used as part of the training data.

Figure 2:
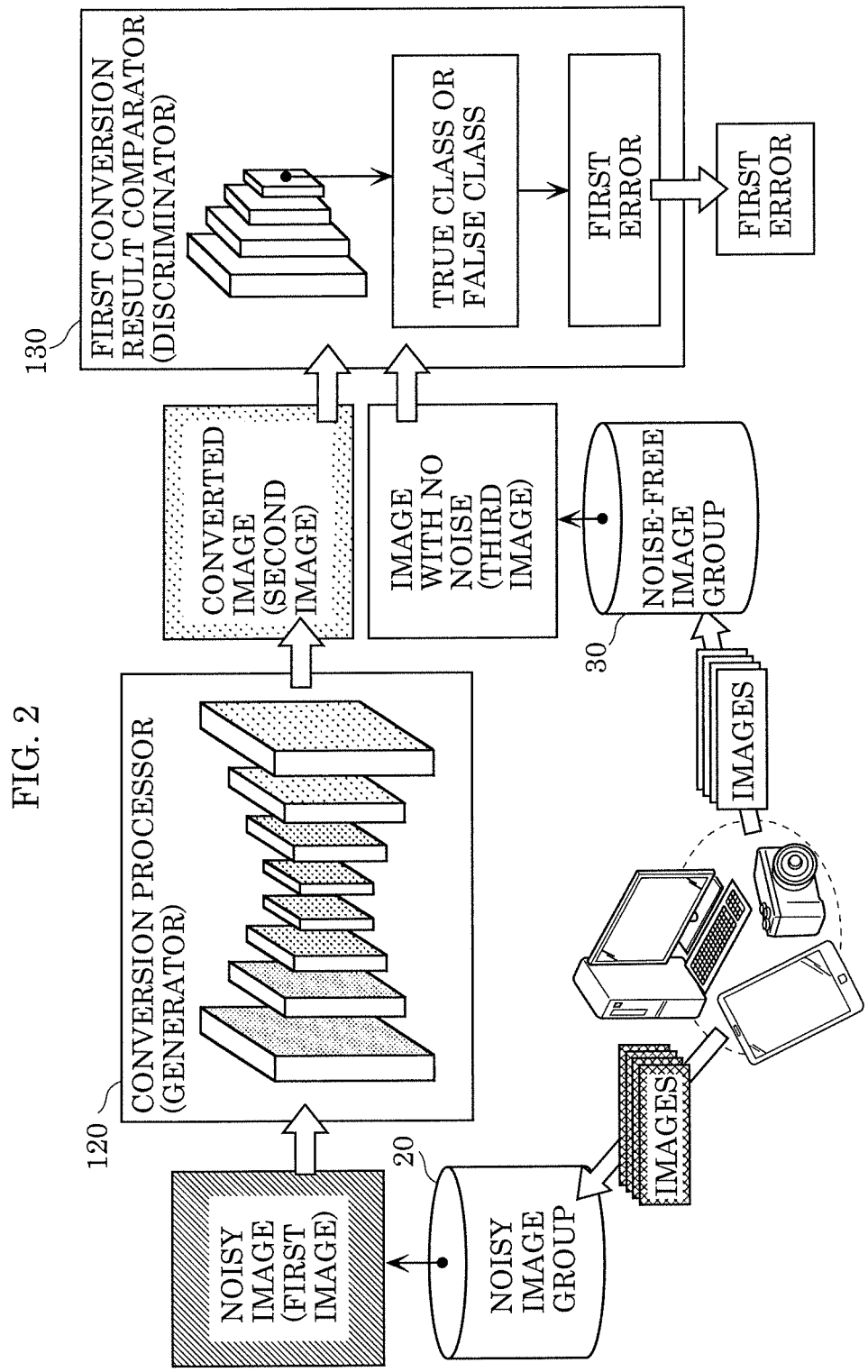
FIG. 2 is a diagram illustrating an overview of input and output of a generator and a discriminator included in Generative Adversarial Networks (GAN) constructed in the information processing apparatus.

First conversion result comparator 130 is a machine learning model included, in combination with conversion processor 120, in Generative Adversarial Networks (GAN) constructed in information processing apparatus 10. In GAN, conversion processor 120, which is a converter, is a generator, and first conversion result comparator 130 is a discriminator. FIG. 2 illustrates an overview of input and output of conversion processor 120 and first conversion result comparator 130.

First conversion result comparator 130 receives the second image outputted by conversion processor 120 as described above, and a third image that is an image that does not include the noise included in the first image (also called an image with no noise in the present disclosure).

The third image is an image that includes a scene identical or corresponding to the scene in the first image and does not include the noise included in the first image. The third image is inputted to information processing apparatus 10 as an image used for training conversion processor 120. For example, many third images may be collected in a recording medium. FIG. 1 and FIG. 2 illustrate the images collected accordingly as a group of images with no noise (hereinafter, also called noise-free image group) 30. Note that the recording medium in which the third images are collected may also be one of the structural components of information processing apparatus 10, or may be a removable recording medium or a recording medium used in another information processing apparatus, same as the recording medium in which the first images are collected.

Note that when the first image originally includes no noise and is prepared by processing an image into a noisy image, the third image including a scene identical to the scene in the first image is the image before being thus processed. Stated differently, the first image and the third image that include the same scene are images having common capturing conditions, such as a subject and composition. The capturing conditions may further include a date and time, and a place where an image is captured, for example. Furthermore, equipment used, and the conditions and settings of the equipment are also included in capturing conditions. Conversely, an image that originally includes a plurality types of noise may be used as the first image including a scene identical to the scene in the third image, and an image obtained by removing the plurality types of noise using a plurality of image processing programs that are capable of removing specific types of noise from the image may be used as the third image including a scene corresponding to the scene included in the first image.

Furthermore, the third image including a scene corresponding to the scene in the first image is an image having a subject and composition common or similar to the first image, and which differs in at least part of other capturing conditions and does not include the noise included in the first image. The following (Example 1) to (Example 3) are examples of combinations of images which can be used as the first image and the third image that include scenes corresponding to each other. When an image that includes noise and an image that does not include the noise described above as examples are included among the images described in each of (Example 1) to (Example 3) below, it is possible to use them as the first image and the third image including scenes corresponding to each other.

Example 1

A plurality of images in which a subject, a place, and a composition are common, and are continuously captured at different ISO settings.

Example 2

A plurality of images in which a subject, a place, and composition are common, and are captured with different lighting conditions. For example, images captured with different illuminance or different ways of applying light (for example: front lighting or backlighting). Images captured in different time periods (example: immediately after sunrise or noon), or different weather (example: sunny or cloudy).

Example 3

A pair of images simultaneously captured with a stereoscopic camera. Here, the following are possible cases: a light source reflected on a glossy surface of a subject is captured in only an image captured with one of the lenses and blown-out highlights occur in the image; or noise resulting from a trouble in the camera is included only in the image generated through the optical system or a processing circuit affected by the trouble.

Moreover, the following images can also be used as the first image and the third image in which scenes corresponding to each other are captured: images of two successive frames included in the same shot in a video, and one of the images is denoised by processing and the other image is not denoised, and the positions of the subject which are different between the frames are matched using motion information.

Furthermore, when noise is included in none of the images that have subjects and compositions common or similar to one another and other capturing conditions are different, the first image may be any one of the images that is processed to add noise, and the third image may be an unprocessed image among the rest of the images.

The data of such a third image is used as part of reference data in information processing apparatus 10 in the training of conversion processor 120, which will be described later. Note that in the present disclosure, the data of the third image may be called correct data or label data, meaning that the data corresponding to the training data which is data of the second image obtained by converting the first image including a scene identical or corresponding to the scene included in the third image.

The first image (noisy image), the second image (converted image), and the third image (image with no noise) that are prepared in this manner differ from one another in presence or absence of noise, the amount of noise, or whether an image obtained by performing conversion on a noisy image. However, there is a corresponding relationship among these images in a sense that the scenes in these images are identical or corresponding to each other. Therefore, there is a corresponding relationship in a similar manner between converted data (training data) which is data of the second image, and reference data (correct data or label data) which is data of the third image.

Reverting to the description of first conversion result comparator 130, first conversion result comparator 130 discriminate whether each of the input images is a converted image outputted as a result of denoising performed by conversion processor 120. More specifically, first conversion result comparator 130 discriminates whether each of the images is a true class or a false class. The true class means an image deriving from noise-free image group 30, and the false class means a converted image outputted by conversion processor 120.

First conversion result comparator 130 then calculates the difference between the converted image and the image with no noise corresponding to the converted image based on the result of the discrimination. The difference (also called a first error in the present disclosure) calculated by first conversion result comparator 130 becomes smaller as the noise in the second image becomes less. That is, the first error becomes smaller as the performance of the denoising of conversion processor 120 becomes better by training. The calculated first error is inputted to conversion parameter updater 160 from first conversion result comparator 130.

Note that the training which will be described later for improving the accuracy of the above-described discrimination is performed also on first conversion result comparator 130, which is the discriminator of GAN. In information processing apparatus 10 in which GAN as described above is constructed, conversion processor 120 is trained to output a second image that is likely to be incorrectly discriminated as an image with no noise by first conversion result comparator 130, in other words, trained to output a second image more similar to an image with no noise by converting the first image. Furthermore, first conversion result comparator 130 is trained to more accurately discriminate whether the second image outputted from conversion processor 120 is an image with no noise (i.e. reference data) or whether an image with no noise is an image with no noise (i.e. reference data). The purpose of GAN is to obtain a converter having a more improved denoising performance by improving both of the performance of conversion processor 120 and first conversion result comparator 130 and thereby causing conversion processor 120 and first conversion result comparator 130 to further compete with each other.

Feature extractor 140 is a trained machine learning model, and receives the second image outputted by conversion processor 120 and the third image from noise-free image group 30. Feature extractor 140 is a machine learning model that is trained for object recognition using many images that do not include noise. For example, feature extractor 140 is a model of the convolutional neural network.

However, feature extractor 140 uses output from an intermediate layer, which is not the final output of the image received, i.e., not a result of the object recognition. The output from the intermediate layer of a neural network used for object recognition shows a particular characteristic of an image that does not include the noise included in the inputted image, i.e., a feature quantity that numerically represents a quality or a tendency of an image that does not include the noise. Examples of the feature here can include contrast, an edge, or a contour, but the feature may be something that is of a higher level and cannot be easily recognized by people. When there are a plurality of intermediate layers, the output from some of the intermediate layers may be used. The feature quantity outputted by each of the intermediate layers is information about features different from one another. Since the feature indicated by the feature quantity outputted by any of the intermediate layers show a particular characteristic with no noise of an inputted image, using feature quantities concerning a greater variety of features in the training may quickly improve the accuracy of the denoising, or further increase the accuracy of the denoising. The feature quantity (hereinafter also called feature information) of each obtained image is inputted to second conversion result comparator 150 from feature extractor 140.

Note that the data of such feature information of the second image is used as part of converted data (training data) in the training of conversion processor 120, which will be described later. Furthermore, the data of such feature information of the third image is used as part of reference data (correct data or label data) in training conversion processor 120, which will be described later.

Second conversion result comparator 150 that has received the feature information from feature extractor 140 calculates the difference between the feature information of the second image, and the feature information of the third image corresponding to the second image. The difference (also called a second error in the present disclosure) calculated by second conversion result comparator 150 becomes smaller as the noise in the second image becomes less. In other words, the second error becomes smaller as the performance of the denoising of the conversion processor becomes better by training. The calculated second error is inputted to conversion parameter updater 160 from second conversion result comparator 150.

Figure 3:
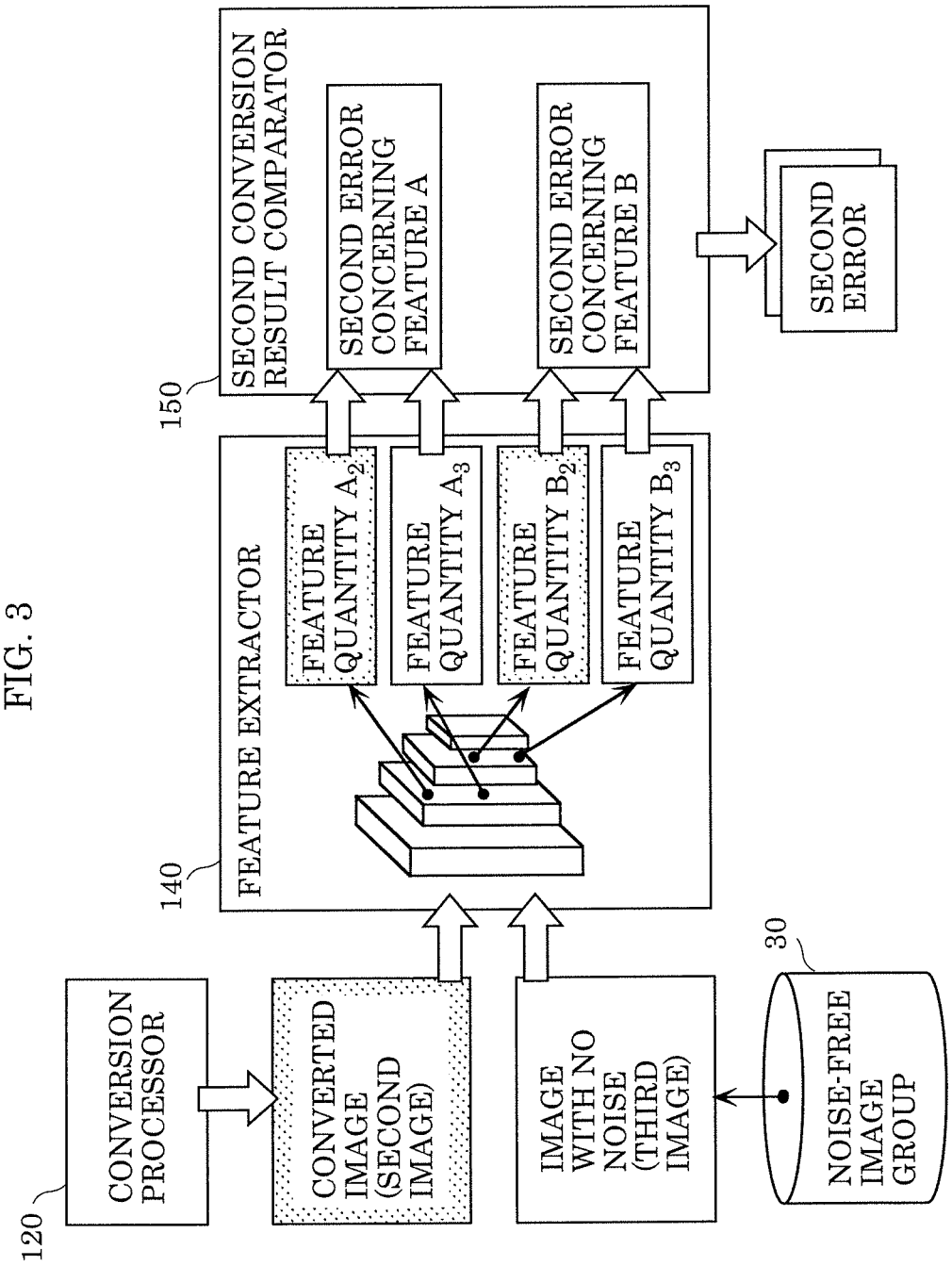
FIG. 3 is a diagram illustrating an overview of input and output of a feature extractor and a second conversion result comparator included in the information processing apparatus.

Note that, when the feature information outputted by a plurality of intermediate layers is used, second conversion result comparator 150 calculates, as the second error, the difference between the feature information of the second image and the feature information of the third image which have been outputted from the same layer. For example, the difference between the feature quantity of the edges outputted by an intermediate layer of feature extractor 140 that has received the second image, and the feature quantity of the edges outputted from the same intermediate layer of feature extractor 140 that has received the third image is calculated as the second error. FIG. 3 illustrates an overview of input and output of feature extractor 140 and second conversion result comparator 150. Referring to FIG. 3, as to feature quantity $A_2$ of the second image and feature quantity $A_3$ of the third image concerning feature A and outputted from one of the layers of the intermediate layer of feature extractor 140 which is a neural network, the difference between feature quantity $A_2$ and feature quantity $A_3$ (the second error concerning feature A) is calculated by second conversion result comparator 150 to which feature quantities $A_2$ and $A_3$ are inputted. Furthermore, the difference between feature quantity $B_2$ of the second image and feature quantity $B_3$ of the third image concerning feature B (the second error concerning feature B) that are outputted from another one of the layers of the intermediate layer of feature extractor 140 is calculated by second conversion result comparator 150 to which feature quantities $B_2$ and $B_3$ are inputted.

Conversion parameter updater 160 updates the parameter of conversion processor 120 based on the first error inputted from first conversion result comparator 130, and the second error inputted from second conversion result comparator 150. The parameter which is to be updated is a value (weight) of a kernel or a value of bias, when conversion processor 120 is a model of the convolutional neural network.

Conversion processor 120 is trained by adjusting the parameter of conversion processor 120 so that the first error and the second error become smaller. The first error indicates the difference between i) the data of the second image that is the converted data and the data of the third image that is the reference data. The second error is the difference between i) the data of the feature quantity of the second image that is the converted data and the feature quantity of the data of the third image that is the reference data. Stated differently, the first error is feedback information about the difference between the second image and the third image, and the second error is feedback information about the difference between features of the second image and the third image as images with no noise.

In order to adjust the parameter, for example, conversion parameter updater 160 adds the first error and the second error, or adds the first error and the second error that are multiplied by a weighting factor. Next, conversion parameter updater 160 calculates a parameter that yields the sum of the first error and the second error equal to zero or a value close to zero to the utmost, and replaces the old parameter of conversion processor 120 with the new calculated parameter.

Note that conversion parameter updater 160 also trains the machine learning for improving the accuracy of first conversion result comparator 130 that discriminates whether each input image is a converted image outputted by conversion processor 120 or data with no noise. This training is performed i) using the second image as data to be discriminated and the third image as reference data, and using the third image as data to be discriminated and the second image as reference data.

The foregoing has described the structural components of information processing apparatus 10 and the function of each of the structural components. Each of the structural components performs its function in information processing apparatus 10 and thereby training by the machine learning is performed on a converter that removes noise included in an image, i.e., conversion processor 120 that is also the generator of GAN. Next, the procedure of the information processing method performed by information processing apparatus 10 for this training will be described.

[1-2. Procedure of Information Processing Method for Training a Converter]

Figure 4:
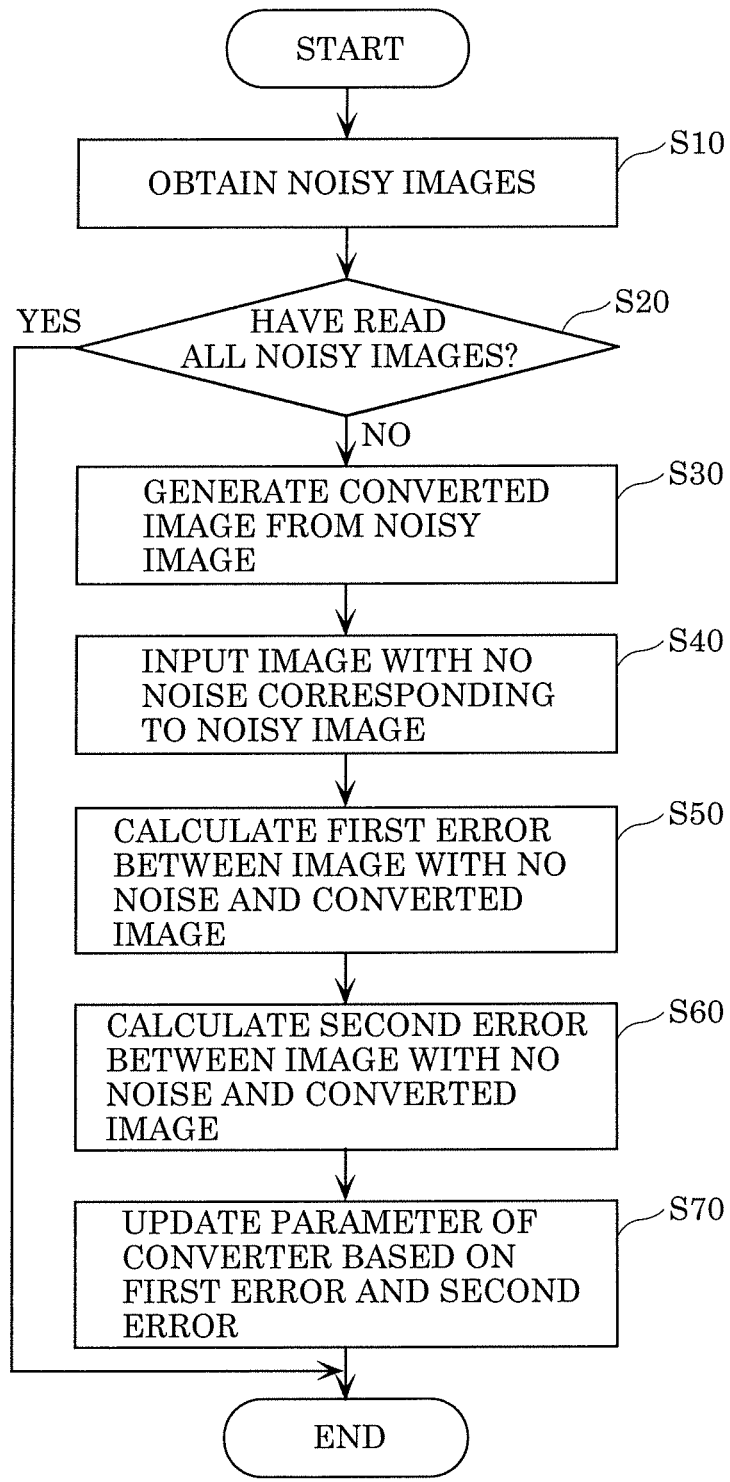
FIG. 4 is a flowchart showing an example of a procedure of an information processing method performed by the information processing apparatus to train a conversion processor by the information processing apparatus.

FIG. 4 is a flowchart showing an example of a procedure of an information processing method performed by information processing apparatus 10 having the above configuration to train conversion processor 120 by machine learning.

First, in information processing apparatus 10, noisy images (first images) are obtained from noisy image group 20 (Step S10), and inputted to image reader 110. Note that there are a plurality of first images, each of the first images includes at least one type of noise, and the first images to be read by image reader 110 include a plurality of types of noise as a whole.

Image reader 110 determines whether there is a first image that has not been read, in other words, whether there is a first image that has not been used in the training (Step S20). When there is no first image that has not been used in the training, in other words, all of the noisy images have been read for the training (YES in Step S20), the training of conversion processor 120 using the information processing method in information processing apparatus 10 is ended. When NO in Step S20, an unread first image is read and then inputted to conversion processor 120.

As denoising, conversion processor 120 converts the first image and generates a converted image (second image) (Step S30). The second image obtained as a result of the denoising is inputted to first conversion result comparator 130 and feature extractor 140.

Furthermore, in information processing apparatus 10, an image with no noise (third image) corresponding to the above first image is obtained from noise-free image group 30, and is inputted to first conversion result comparator 130 and feature extractor 140 (Step S40).

First conversion result comparator 130 calculates the difference between the second image and the third image that have been received, and obtains the first error (Step S50). The first error is inputted to conversion parameter updater 160.

Furthermore, feature extractor 140 obtains the feature quantity of the second image and the feature quantity of the third image, which indicate the features of an image with no noise, based on the second image and the third image which have been received, respectively. The feature quantity of the second feature information and the feature quantity of the third feature information that have been obtained are inputted to second conversion result comparator 150.

Second conversion result comparator 150 calculates the difference between the second feature information and the third feature information that have been received, and obtains the second error (Step S60). The second error is inputted to conversion parameter updater 160.

Conversion parameter updater 160 calculates a new parameter of conversion processor 120 based on the first error and the second error that have been received, and updates the parameter of conversion processor 120 with the calculated parameter (Step S70). The new parameter calculated in Step S70 yields a first error and a second error that are smaller than the first error and the second error that are obtained when the conversion process using the old parameter is performed. Accordingly, the machine learning using the second image and the feature information of the second image as converted data, and using the third image and the feature information of the third image as reference data corresponding to the converted data is performed.

The foregoing has described the procedure of the information processing method performed by information processing apparatus 10 using an example of training conversion processor 120 which is a single model by machine learning. Note that the information processing method is not limited to the above-mentioned example of the procedure. For example, the order of Step S50 and Step S60 in the example of the procedure may be switched.

[1-3. Effects]

The difference between the second image that is obtained as a result of the conversion process by conversion processor 120 using the above new parameter and the third image is reduced compared with the difference between the second image that is obtained as a result of the conversion process using an old parameter and the third image. This effect is obtained by the training in which conversion processor 120, which is a converter (generator or denoiser) that performs conversion for the denoising on an image, is trained to reduce the first error, i.e., generate an image that is more closely similar to an image with no noise by converting a noisy image.

Furthermore, the difference between the second image that is obtained as a result of the conversion processing using the new parameter and the third image is also reduced with respect to the features of an image with no noise, compared with the difference between the second image that is obtained as a result of the conversion processing using an old parameter and the third image. This effect is obtained by the training in which conversion processor 120 is trained to reduce the second error, i.e., generate an image having features closer to the features of an image with no noise by converting a noisy image. Stated differently, the converted image outputted after conversion processor 120 is trained as described above gives less awkwardness as an image with no noise, in other words, seems more natural than the converted image that is outputted before the training.

Conversion processor 120 obtained through such training is not specialized for a specific type of noise, and can remove appropriately various types of noise.

Furthermore, conversion processor 120 to be trained as described above is a single machine learning model. Therefore, in the denoising performed by conversion processor 120, the amount of computation is reduced compared with the conventional denoising corresponding to a plurality of types of denoising using a plurality of neural networks.

Next, an inference phase will be described in which conversion processor 120 which is the converter obtained as described above infers, from an image that include noise, an image that does not include the noise. The information processing apparatus including conversion processor 120 is used as an example.

[2. Inference (Denoising) Phase]

[2-1. Configuration]

Figure 5:
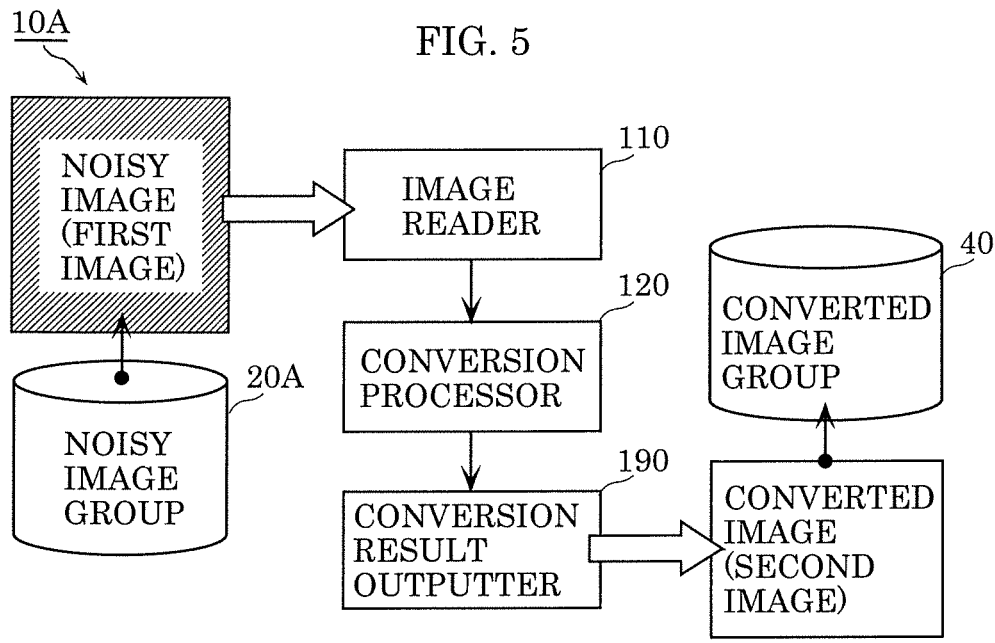
FIG. 5 is a diagram illustrating an example of a functional configuration and overview of input and output between functional components of another information processing apparatus according to the embodiment.

FIG. 5 is a diagram illustrating an example of functional configuration of another information processing apparatus and an overview of input and output between functional configurations according to the present embodiment. Information processing apparatus 10A according to the present embodiment receives an image that includes noise, and obtains a denoised image by converting the received image.

As illustrated in FIG. 5, information processing apparatus 10A includes image reader 110, conversion processor 120, and conversion result outputter 190. Among the structural components of information processing apparatus 10A, the structural components same as the structural components of information processing apparatus 10 share the same reference signs. Note that the description of the common structural components may be simplified in the following description.

For example, information processing apparatus 10A may be implemented by one computer including a processor and a memory. In this case, the above-mentioned structural components of information processing apparatus 10A may be functional structural components implemented by the processor executing one or more programs stored in the memory, for example. Note that information processing apparatus 10A may be another computer different from information processing apparatus 10, or information processing apparatus 10A and information processing apparatus 10 may be implemented by one computer.

Image reader 110 receives an image that includes noise, i.e., a noisy image. For example, many noisy images may be collected in the recording medium as images to be inputted to be denoised by information processing apparatus 10A. The recording medium may be one of the structural components of information processing apparatus 10A. As another example, the recording medium may be a removable recording medium connected to an input and output interface (not illustrated) included in information processing apparatus 10A. As still another example, the input and output interface may be used for communication, and the recording medium may also be used in one or more apparatuses that communicate with information processing apparatus 10A through wired or wireless communication. FIG. 5 illustrates the images collected accordingly as noisy image group 20A.

Although the images included in noisy image group 20A are different from the images included in noisy image group 20, the images included in noisy image group 20A include various types of noise such as that listed above as examples. Hereinafter, noisy images to be inputted to image reader 110 of information processing apparatus 10A are also called first images, as in the description of the training phase. For example, each of the first images is an image generated by the imaging device (image sensor) included in a camera etc., and include noise caused by some kind of factor in the camera or an image-capturing environment. The first image is inputted to conversion processor 120 from image reader 110.

Conversion processor 120 is an example of the converter (generator or denoiser) stored in the memory included in information processing apparatus 10A in the present embodiment. However, the converter here differs from the converter described in the training phase. The converter here is an inference model obtained as a result of training by machine learning using the above-mentioned information processing method. In other words, conversion processor 120 is a single machine learning model that removes a plurality of types of noise, and is a model of the convolutional neural network, for example. When information processing apparatus 10A is a different apparatus from information processing apparatus 10, information processing apparatus 10A is an information processing apparatus equipped with conversion processor 120 trained by information processing apparatus 10.

After conversion processor 120 has performed the denoising on the first image, conversion processor 120 outputs a converted image as a result of the processing. As in the description in the training phase, the converted image outputted by conversion processor 120 is also called a second image in the description of the inference phase. The second image in the inference phase is obtained by performing more advanced denoising than the denoising that can be performed by conversion processor 120 at the beginning of the training phase. Thus, the second image in the inference phase is more natural image as an image with no noise.

Conversion result outputter 190 outputs the second image outputted by conversion processor 120. For example, the second image may be outputted to a recording medium in which the second images are collected. FIG. 5 illustrates the images collected accordingly as converted image group 40. The recording medium may be one of the structural components of information processing apparatus 10A, a removable recording medium, or a recording medium used in another information processing apparatus, same as the recording medium in which noisy image group 20 described above is collected. For example, information processing apparatus 10A may be implemented as a system LSI and incorporated in the imaging device such as a camera or a driving recorder. Conversion result outputter 190 may output an image to the recording medium used in such an imaging device. In this case, even if an image captured on conditions that are more likely to cause noise, such as high sensitivity capturing in a dark place, can be recorded on such a recording medium with a clear image quality and less noise. As another example, the second image may be outputted to a display apparatus as an image displayed to a user. For example, information processing apparatus 10A may be implement as a system LSI and incorporated in an in-vehicle rear-view monitor system or an electron mirror system, and the second image may be outputted to the monitor equipped in the vehicle. In this case, even if an image captured on conditions that are likely to cause noise, the monitor can display the image with a clear image quality and less noise. Moreover, since the amount of computation is reduced, information processing apparatus 10A used in such an in-vehicle system may contribute to reduction in time lag between capturing an image and displaying the image. As still another example, the second image may be outputted to other hardware or software that performs certain image processing. For example, the second image may be inputted to a program for recognizing an object. In this case, information processing apparatus 10A contributes to achieving more accurate object recognition with fewer recognition errors or less omission. Moreover, since the amount of computation is reduced, information processing apparatus 10A is used in such an in-vehicle system may contribute to reduction in processing time required from capturing an image to completing recognizing an object. Accordingly, the second image is outputted from conversion result outputter 190 in a form in accordance with its use.

Next, the procedure of the information processing method for denoising performed by information processing apparatus 10A having such a configuration will be described.

[2-2. Procedure of Information Processing Method for Denoising]

Figure 6:
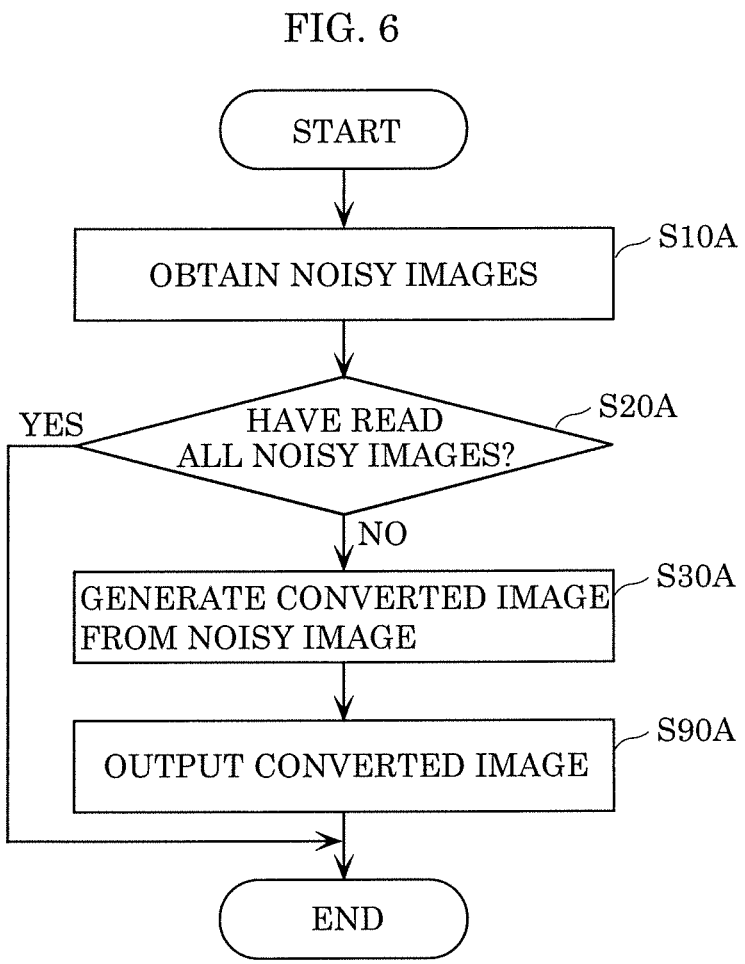
FIG. 6 is a flowchart showing an example of a procedure of an information processing method performed by the other information processing apparatus to denoise an image.

FIG. 6 is a flowchart showing an example of a procedure of an information processing method for denoising performed by information processing apparatus 10A.

First, in information processing apparatus 10A, noisy images (first images) are obtained (Step S10A), and inputted to image reader 110.

Image reader 110 determines whether there is a first image that has not been read, in other words, whether there is a first image on which the denoising has not been performed (Step S20A). When there is no first image on which the denoising has not been performed, i.e., when all of the first images have been denoised (YES in Step S20A), the denoising on the first image using the information processing method in information processing apparatus 10A is ended. When NO in Step S20A, an unread first image is read and then inputted to conversion processor 120.

As denoising processing, conversion processor 120 converts the first image and generates a converted image (second image) (Step S30A).

The second image obtained as a result of the denoising processing is inputted to feature result outputter 190 from conversion processor 120, and is outputted from feature result outputter 190 having a form in accordance with its use.

The foregoing has described the procedure of the information processing method performed by information processing apparatus 10A equipped with conversion processor 120 that is a model trained by machine learning, as an example. Note that the information processing method is not limited to the above-mentioned example of the procedure.

Furthermore, the information processing method may be performed by information processing apparatus 10A by executing a predetermined program using a memory by a processor included in information processing apparatus 10A.

[2-3. Effects]

Conversion processor 120 that infers an image with no noise from noisy images in the inference phase is the above-described machine learning model that is trained using the method described in description of the training phase. Therefore, various types of noise can be appropriately removed without being affected by the types of noise included in the noisy image that is inputted.

Furthermore, conversion processor 120 is a single machine learning model. Therefore, in the denoising performed by conversion processor 120, the calculation amount is reduced compared with the conventional denoising processing corresponding to a plurality of types of denoising using a plurality of neural networks. Thus, restriction on a practical execution environment may be eased in conversion processor 120 compared with the conventional denoiser. For example, conversion processor 120 may be equipped in an edge device with a limited capability of the processor or limited available power, etc. to enhance usefulness of the edge device.

(Variations and Other Supplemental Matters)

The information processing method, the information processing apparatus, and the program according to one or more aspects of the present disclosure are not limited to the above detailed description of the embodiment. The present disclosure also includes variations of the embodiment conceived by those skilled in the art unless they depart from the scope of the present disclosure. Examples of such variations and other supplemental matters to the description of the embodiment are listed below.

(1) The types of noise included in the first image and to be removed by the denoising processing is not limited to the types of noise listed in the embodiment above. For example, fog or dust that has occurred in image capturing is captured in the image irrespective of, for example, the performance, settings, or a trouble in a camera. Thus, an object that has been unavoidably captured in the image and may therefore impair usefulness of the image may be included in the types of noise included in the first image and to be removed by denoising. This widens the range of the conditions of capturing an image on which object recognition can be accurately performed, for example.

(2) The meaning of the phrase "the image that does not include the noise (or image with no noise)" used in the embodiment is not limited to an image that does not include noise at all. For example, as exemplified in the description of the inference phase, an image with no noise may be determined based on the feature quantity as an image with no noise of each image obtained using feature extractor 140. Other various conventional image analyses may also be used in the determination. As another example, an image with no noise may determined based on other information obtained from image data such as luminance distribution, meta information of an image according to information such as Exchangeable image file format (Exif), etc., or combinations of those. As still another example, an image with no noise may be visually determined by a person. Moreover, criteria for determining whether an image is an image with no noise may differ according to the denoising performance required for the trained converter or use of an image after the image is denoised by the converter. Moreover, the noise included in "an image that includes noise (or noisy image)" is not limited to the noise which can be visually recognized by a person. For example, the noise may be noise that is unlikely to be recognized by a person in a screen display or printed material, but may be a cause of lowering the accuracy of recognition in the processing performed by a program, such as object recognition.

(3) The machine learning model included in the information processing apparatus according to the embodiment is not limited to the machine learning model based on the technique of the convolutional neural network that is described above as an example. Each model that functions as conversion processor 120, first conversion result comparator 130, feature extractor 140, or second conversion result comparator 150 may be trained by other machine learning techniques as long as the trained model can provide its function appropriately.

(4) Although the example in which images are processed has been described in the above embodiment, the processing may be performed on sensor data other than images. Any sensor data can be processed as long as it is sensor data whose reference data can be obtained, such as voice data outputted from a microphone, point cloud data outputted from radars such as LiDAR, pressure data outputted from a pressure sensor, temperature data or humidity data outputted from a temperature sensor or a humidity sensor, and scent data outputted from a scent sensor. In this respect, the data of the first image, the second image, and the third image are examples of first sensor data, second sensor data, and third sensor data, respectively. The first sensor data, the second sensor data, and the third sensor data are sensor data of the same or corresponding scene.

(5) A portion or all of the structural components of each of the information processing apparatuses may be configured from one system large scale integration (LSI). A system LSI is a super-multifunction LSI manufactured with a plurality of components integrated on a single chip, and specifically is a computer system configured of a microprocessor, a read only memory (ROM), and a random access memory (RAM), for example. A computer program is stored in the ROM. The system LSI achieves its function as a result of the microprocessor operating according to the computer program.

Note that the term system LSI has been used as an example, but depending on the degree of integration, IC, LSI, super LSI, and ultra LSI are also used. Moreover, the method of circuit integration is not limited to LSI. Integration may be realized with a dedicated circuit or a general purpose processor. A field-programmable gate array (FPGA) or a reconfigurable processor that allows reconfiguration of the connection or configuration of the inner circuit cells of the LSI circuit can be used after production of the LSI.

Such a system LSI may be included, for example, in mobile information terminals with a camera, such as a digital camera and a smartphone, or various types of in-vehicle systems, such as advanced driver-assistance systems including a rear-view monitor system or an object detection function.

Moreover, when advancement in semiconductor technology or derivatives of other technologies brings forth a circuit integration technology which replaces LSI, it will be appreciated that such a circuit integration technique may be used to integrate the functional blocks. Application of biotechnology is also a possibility.

(6) The structural components of each of the information processing apparatuses described above may be implemented as, for example, structural components of an information processing system that includes a processor and a memory, and in which a plurality of computers that can communicate with each other operate in cooperation to provide the same functions as each of the information processing apparatuses described above. In this case, these structural components are implemented by, for example, some or all of the processors included in these computers executing one or more programs stored in some or all of the memories included in these computers.

(7) An aspect of the present disclosure may be not only such information processing apparatuses, but also an information processing method including the characteristic structural components included in the information processing apparatuses as steps. Such an information processing method is the information processing method described above with reference to the flowchart in FIG. 4 or FIG. 6, for example. Moreover, an aspect of the present disclosure may be a computer program which causes a computer to execute each characteristic step included in the information processing method. Moreover, an aspect of the present disclosure may be a non-transitory computer-readable recording medium on which such a computer program is recorded.

Although only an exemplary embodiment of the present disclosure and variations thereof have been described in detail above, those skilled in the art will readily appreciate that many modifications are possible in the exemplary embodiments and variations thereof without materially departing from the novel teachings and advantages of the present disclosure. Accordingly, all such modifications are intended to be included within the scope of the present disclosure.

INDUSTRIAL APPLICABILITY

The present disclosure is widely applicable to, for example, an apparatus that performs processing for removing noise from various types of sensor data, for example, image data.

What is claimed is:
1. An information processing method, comprising the following performed using a computer:
obtaining first sensor data that is sensor data of a scene and includes noise;
inputting the first sensor data to a single converter, and obtaining second sensor data outputted from the single converter as a result of denoising performed on the first sensor data by the single converter;

obtaining third sensor data that is sensor data of a scene identical or corresponding to the scene in the first sensor data, does not include the noise, and is different from the second sensor data;

obtaining feature information of the second sensor data and feature information of the third sensor data, based on the second sensor data and the third sensor data, respectively;

calculating a difference between the second sensor data and the third sensor data;

calculating a difference between the feature information of the second sensor data as converted data and the feature information of the third sensor data as reference data corresponding to the converted data; and updating a parameter of the single converter through training the single converter by machine learning using (i) the calculated difference between the second sensor data and the third sensor data and (ii) the calculated difference between the feature information of the second sensor data as converted data and the feature information of the third sensor data as reference data corresponding to the converted data.

2. The information processing method according to claim 1, wherein the feature information of the second sensor data is obtained by inputting the second sensor data to a model that is trained by machine learning to output feature information of sensor data when the sensor data is inputted to the model, and the feature information of the third sensor data is obtained by inputting the third sensor data to the model.

3. The information processing method according to claim 2, wherein the model is a multilayer neural network model, and the feature information of the second sensor data and the feature information of the third sensor data are outputted from an intermediate layer of the model.

4. The information processing method according to claim 3, wherein the intermediate layer comprises a plurality of layers, and the feature information of the second sensor data and the feature information of the third sensor data are outputted from a same layer among the plurality of layers.

5. The information processing method according to claim 1, wherein the difference between the second sensor data and the third sensor data is outputted from a discriminator by inputting the second sensor data and the third sensor data to the discriminator, the discriminator being trained by machine learning to discriminate whether sensor data inputted is data converted by the single converter or reference data.

6. The information processing method according to claim 1, wherein the first sensor data, the second sensor data, and the third sensor data are image data outputted from an image sensor.

7. An information processing apparatus, comprising:

a processor; and a memory, wherein the memory stores a single converter, the processor:

obtains first sensor data that is sensor data of a scene, includes noise, and is generated by an imaging device;

inputs the first sensor data to the single converter, and obtains second sensor data outputted from the single converter as a result of denoising performed on the first sensor data by the single converter;

outputs the second sensor data obtained;

obtains third sensor data that is sensor data of a scene identical or corresponding to the scene in the first sensor data, does not include the noise, and is different from the second sensor data;

obtains feature information of the second sensor data and feature information of the third sensor data, based on the second sensor data and the third sensor data, respectively;

calculates a difference between the second sensor data and the third sensor data;

calculates a difference between the feature information of the second sensor data as converted data and the feature information of the third sensor data as reference data corresponding to the converted data; and updates a parameter of the single converter through training the single converter by machine learning using (i) the calculated difference between the second sensor data and the third sensor data and (ii) the calculated difference between the feature information of the second sensor data as converted data and the feature information of the third sensor data as reference data corresponding to the converted data.

8. A non-transitory computer-readable recording medium readable from a computer including a processor and a memory, the recording medium having a computer program recorded thereon for causing the computer, when executed by the processor using the memory, to perform operations including:

obtaining first sensor data that is sensor data of a scene, includes noise, and is generated by an imaging device;

inputting the first sensor data to a single converter stored in the memory, and obtaining second sensor data outputted from the single converter as a result of denoising performed on the first sensor data by the single converter;

outputting the second sensor data obtained;

obtaining third sensor data that is sensor data of a scene identical or corresponding to the scene in the first sensor data, does not include the noise, and is different from the second sensor data;

obtaining feature information of the second sensor data and feature information of the third sensor data, based on the second sensor data and the third sensor data, respectively;

calculating a difference between the second sensor data and the third sensor data;

calculating a difference between the feature information of the second sensor data as converted data and the feature information of the third sensor data as reference data corresponding to the converted data; and updating a parameter of the single converter through training the single converter by machine learning using (i) the calculated difference between the second sensor data and the third sensor data and (ii) the calculated difference between the feature information of the second sensor data as converted data and the feature information of the third sensor data as reference data corresponding to the converted data.

* * * * *